INVENTOR.
RICHARD E. SELF

United States Patent Office 3,473,783
Patented Oct. 21, 1969

3,473,783
HIGH-FLOW CAPACITY BALANCED SPINDLE VALVE
Richard E. Self, 3221 Brimhall Drive, Los Alamitos, Calif. 90720
Filed Aug. 24, 1966, Ser. No. 574,623
Int. Cl. F16k 1/10, 39/04
U.S. Cl. 251—282                                11 Claims

ABSTRACT OF THE DISCLOSURE

A high-flow capacity spindle valve with a high-pressure resisting bubble tight seal and substantially free from side thrust loads on the spindle. The valve has a body with an axial cavity and a pair of coaxial flow passages at an acute angle to the axial cavity. The spindle has a sliding fit with the body and flow passage therethrough at the same acute angle as the coaxial flow passages to provide a straight line flow through the valve in its fully opened position. Relief cavities are provided in the axially extending cavity of the body and a barrier coacting with the spindle separates the relief cavities. Each relief cavity provides pressure communication completely around the spindle and communicates with a separate coaxial flow passage to relieve side loads on the spindle.

---

The present invention deals with an improved valve particularly suitable for the transportation of liquids or gases under high pressures with the minimum flow resistance and yet the maximum sealing and operational ability.

Typically, a gate valve, a lug valve or a ball valve is used in installations where capacity is the most important, since these valves provide passages relatively free of flow disturbances. On the other hand, at high pressures where sealing and operational ease are important, the globe type valve is ordinarily used because of its sealing ability and operational ease. Consequently, at high pressures there has been a sacrifice either in flow resistance or in sealing ability and operational ease.

The need still remains, therefore, for a valve capable of providing high flow capacity, effective seating under high pressure conditions and reduced side or thrust loads for ease of operation. The satisfaction of that need is the principal object of the present invention.

One object of the invention is to provide a fluid passage configuration that offers the minimum flow resistance.

Another object of the invention is to provide an improved valve assembly which has very small side loads existing across the spindle element thereby eliminating valve damage and reducing operational effort.

Another object of the invention is to provide a pressure balanced valve assembly in which a pressure balance is achieved along the spindle axis when pressure is applied in either direction.

Still another object of the invention is to provide a novel type of seat insert which serves both as a seat and a body joint sealing element.

Another object of the invention is to provide a combination of resilient sealing element and metallic sealing elements which operates to provide an effective bubble tight seal when the valve is closed.

Still another object of the invention is to provide a seal configuration for a valve which is capable of withstanding extremely high temperatures without destruction of the integrity of the seal therein.

In accordance with the present invention, I provide a valve including a body portion having an axial passage therethrough. A pair of coaxial fluid outlet passages are disposed at an acute angle to the axis of the body. A spindle is suitably inserted into the axial passage of the body portion, the spindle having a flow passage movable into flow establishing communication with the fluid passages and providing a substantially constant diameter flow passage therethrough. The body portion has adequate communication around the spindle to minimize unequal pressures across the spindle. A metallic sleeve is secured to the spindle and has a seating face thereon which cooperates with a complementarily shaped seating face on an insert ring held in clamped engagement between separable portions of the body. A resilient sealing element is interposed between the sleeve and the spindle, with the geometry of the parts being such that the sleeve, the spindle, and the insert totally enclose the resilient sealing element when the valve is closed to provide a bubble tight seal.

A further description of the present invention will be made in conjunction with the attached sheets of drawings which illustrate a preferred embodiment thereof.

In the drawings:

FIGURE 4 is an enlarged fragmentary view of the sealing elements in the valve closing position.

As shown in the drawings:

Figure 1:
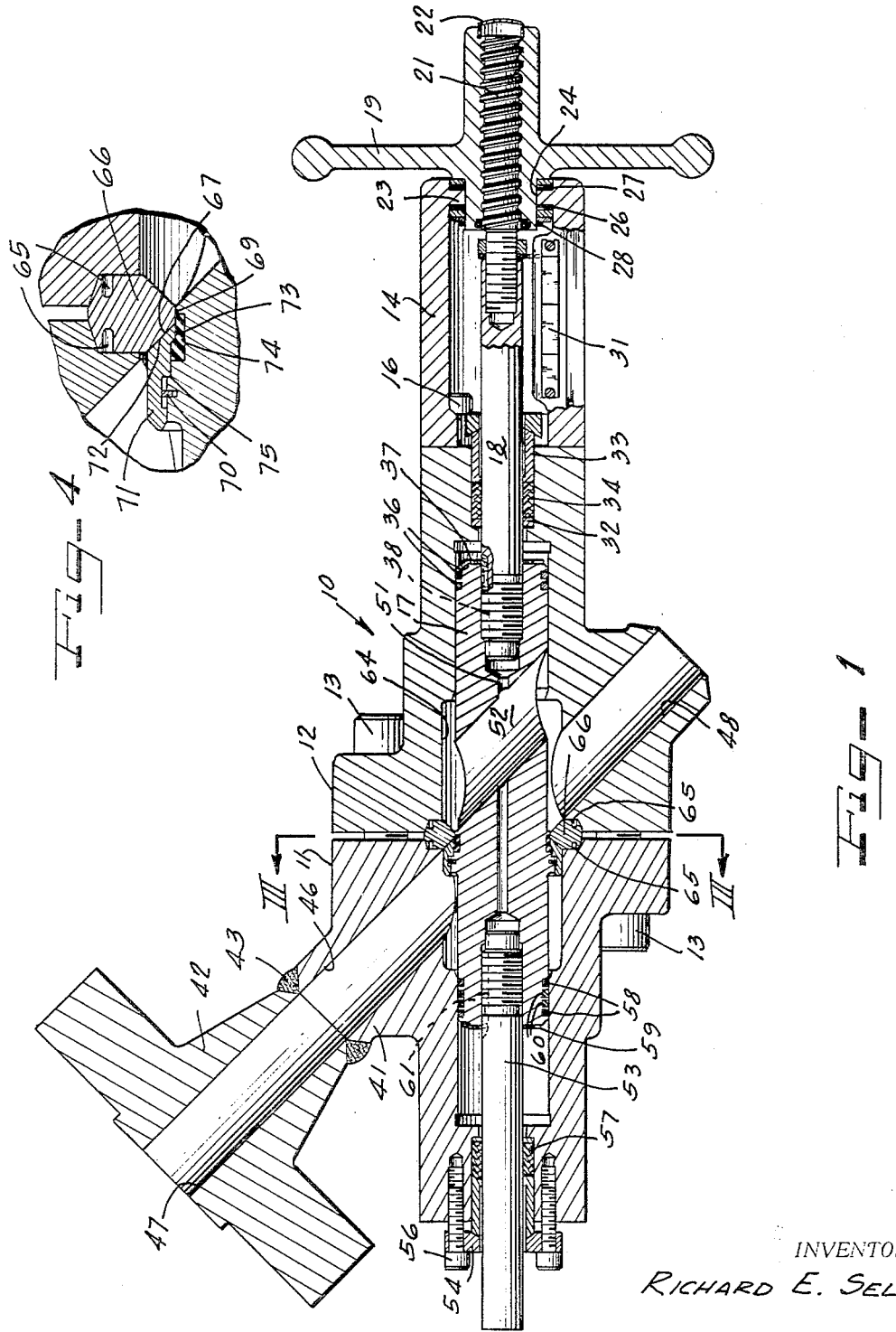
FIGURE 1 is a cross-sectional view of a valve produced according to the present invention in its closed position.

In FIGURE 1, reference numeral 10 indicates generally a valve assembly designed for low flow resistance, high pressure service. The body of the valve may be made up of two separable body sections 11 and 12 which are held together by means of a plurality of circumferentially spaced cap screws 13, although a single unit body can be used as well.

A yoke 14 is secured coaxially with the body section 12 by means of cap screws 16. A spindle 17 is threadedly secured to a stem 18 extending in the coaxial passage formed by the mating passages in the body section 12 and in the yoke 14. A handwheel 19 is internally threaded along its axis to engage a drive screw 21 forming part of the stem assembly. A cap 22 is provided to close off the end of the drive screw 21.

The yoke 14 has a radially inwardly extending annular flange portion 23 disposed about a collar 24 formed integrally with the handwheel 19. A pair of thrust bearings 26 and 27 are disposed on opposite sides of the annular flange portion 23. A snap ring 28 fitting into a suitable slot in the collar 24 holds the thrust bearings in assembled relation. Suitable indicating means may be provided on the stem assembly to cooperate with an indicator scale 31 to give a visual indication of an axial position of the spindle 17 within the body. Sealing relation between the stem 18 and the body section 12 is achieved by means of a sealing assembly including an insert ring 32 and a sleeve 33 between which there is disposed a series of packing rings 34.

A pair of wear rings 36 are provided about the periphery of the spindle 17, and a lock washer 37 is disposed over the rear end of the spindle itself to lock the spindle 17 to the stem 18. An axially extending groove 38 is provided in the forward end of the stem 18 to provide an internal venting passage as will be explained in a succeeding portion of this specification.

The body section 11 has a throat portion 41 to which there is secured a fitting 42 by means of a weld 43 or the like. A fluid outlet passage 46 in the body section 11 registers with a fluid outlet passage 47 in the fitting 42.

Similarly, the body section 12 is provided with a fluid outlet passage 48 which is in coaxial relation with the fluid passage 46. The axes of these fluid outlet passages 46 and 48 are at an acute angle to the axis of the spindle 17, measured in a clockwise direction as viewed in FIGURE 1. It is generally preferable that the outlet passage provide about a 45° angle with the axis of the spindle 17.

An axial passage 51 formed in the spindle 17 communicates with a flow passage 52 formed about the central portion of the spindle 17. A threaded rod 53 is received at the opposite end of the spindle 17, and extends through a ring 54 held against the end of the body section 11 by means of cap screws 56. Packing elements 57 are provided about the rod 53 to provide a seal at the outer extremity of the valve body.

The forward end of the spindle 17 is also provided with wear rings 58 and resilient seal rings 60 located in suitable grooves within the spindle. A lock washer 59 operates to lock the end of the spindle body to the rod 53. An axial passage 61 is formed in the rod 53 to provide internal venting of the spindle assembly as in the case of the passage 38.

A relieved area 64 is provided in the body section 12 adjacent the fluid outlet portion. The chamber provides a volume of revolution about the spindle which has a length and depth sufficient to communicate enough flow and pressures to insure that little or no pressure gradient can exist around the spindle in proximity to the flow passage in the spindle during opening or closing. This feature minimizes unbalanced forces perpendicular to the spindle axis.

Figure 2:
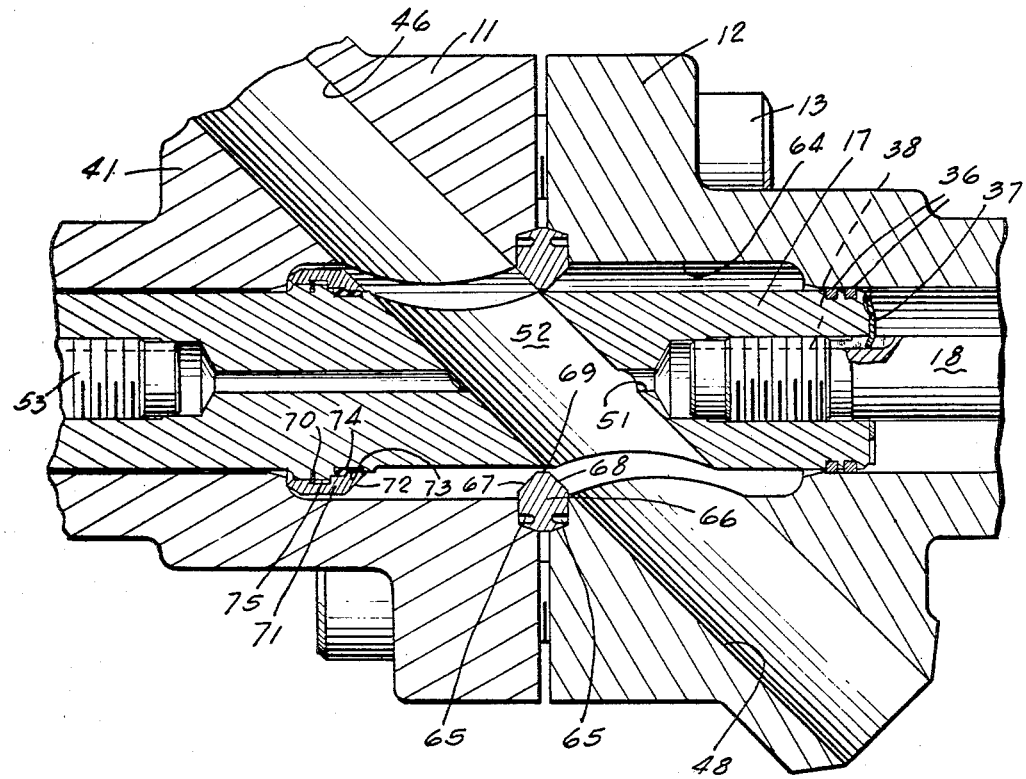
FIGURE 2 is a somewhat enlarged fragmentary cross-sectional view of the valve in its open position.
Figure 3:
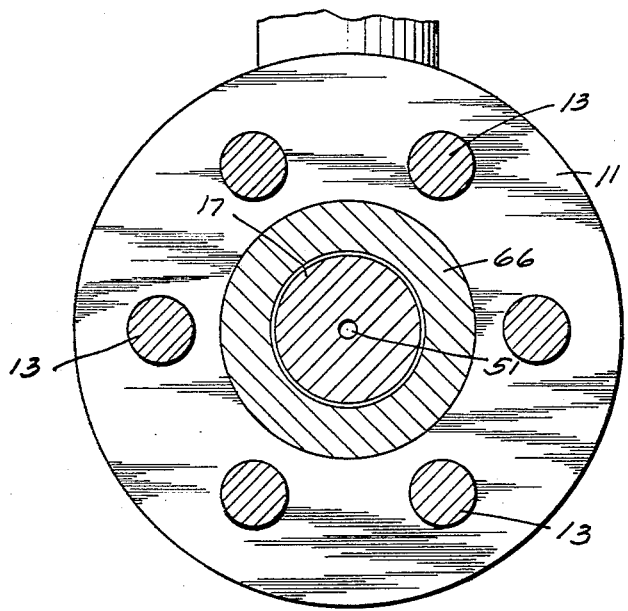
FIGURE 3 is a cross-sectional view taken substantially along the line III—III of FIGURE 1.

A metallic ring 66 is clamped between the body sections 11 and 12 with an interference fit. The ring 66 has opposed grooves 65 rendering the outer periphery of the ring 66 deformable into the socket provided by the body sections 11 and 12. As best seen in the somewhat enlarged view of FIGURE 2, the ring 66 has a pair of oppositely converging frusto-conical surfaces 67 and 68 separated by a cylindrical land portion 69 whose axis coincides with the axis of the spindle 17.

A stepped sleeve 71 is slidably carried by the spindle body, the limit of movement being prescribed by a snap ring 70 on the spindle body. The sleeve 71 has a frusto-conical face 72 arranged to be received against the face 67 of the ring 66 in complete sealing engagement as illustrated in FIGURE 4 of the drawings, since the two faces are complementarily shaped. The sleeve 71 has a radially inwardly extending flange portion 73 which is arranged to bear against a resilient seal element 74 disposed in a groove formed in the spindle body. On application of thrust loads to the spindle, compression of the resilient sealing element 74 occurs, allowing translation of the spindle 17 relative to the sleeve 71. With sufficient thrust, the spindle 17 advances to a point where the resilient sealing element 74 is then completely surrounded by the spindle 17, the sleeve 71, and the land portion 69 of the ring 66, as illustrated in FIGURE 4 of the drawings. During this action, the resilient seal element 74 is merely volumetrically compressed and not permanently deformed into a smaller volume. Since the sleeve 71 is restrained against axial movement along the spindle 17 when the resilient seal element 74 is being compressed, there is a metal-to-metal seal existing between the spindle 17 and the sleeve 71 indicated at reference numeral 75 in FIGURE 4, as well as a metal-to-metal seal between the tapered surface 72 of the sleeve 71, and the tapered surface 67 of the ring insert 66. The result is the maintenance of a sealed condition which is capable of withstanding temperatures in excess of about 2000° F., making it fire safe at high temperature and high pressure environments.

With the valve assembly of the present invention, it will be noted that the seating function is accomplished in two steps through the utilization of the completely enclosed resilient sealing element 74. The coopertaion between the sleeve, the spindle, and the ring insert in completely confining the resilient sealing element provides an effective bubble tight seal which is completely protected against ambient environmental conditions.

With the valve of the present invention, there is provided a structure which combines the flow capacity of a gate valve or the like with the seating ability of a globe valve type structure. These advantages are achieved in conjunction with a highly effective seating means, and higher pressure capability.

I claim as my invention:

1. A high flow capacity control valve comprising a body having a pair of coaxial fluid flow passages at an acute angle to the axis of said body, said body having an axially extending cavity therein, a spindle having a flow passage therethrough at the same acute angle as said flow passages in said body, said spindle being movable to place said flow passage into alignment with said coaxial flow passages of the body to provide a straight line flow passage through said valve in the fully opened position, said body having relief cavities in said axially extending cavity providing pressure communication around the spindle, said spindle having a sliding fit with said body, and a barrier in said axially extending cavity of the body rigidly fixed to said body and coacting with said spindle separating the relief cavities and preventing flow other than leakage between said relief cavities thereby reducing spindle side loads.

2. A valve comprising a body having an axial passage therethrough, means providing a pair of coaxial fluid outlet passages having an axis at an acute angle to the axis of said axial passage, a spindle mounted for axial movement within said axial passage, said spindle having a flow passage therethrough movable into flow establishing full diameter communication between said pair of fluid outlet passages when said valve is open, said spindle having an annular groove thereabout adjacent said flow passage, a compressible sealing element received in said groove, a sleeve carried by said spindle and having a first seating surface pressed against said sealing element, said sleeve having a second seating surface of generally frusto-conical shape, a ring insert rigidly clamped by said body and having a sealing surface complementary to said second seating surface for engaging said second seating surface in sealing relation, said ring insert also having a radially inwardly extending land portion arranged to contain said sealing element when said valve is closed.

3. The valve of claim 2 in which said spindle includes internal venting passages communicating said flow passage with the interior of said body.

4. The valve of claim 2 in which said sleeve, said spindle and said ring insert cooperate to completely enclose said compressible sealing element in the closed portion of said valve to thereby provide a bubble tight seal.

5. The valve of claim 2 in which said sleeve has limited sliding movement along said spindle whereby said sleeve is axially movable to protect said resilient sealing element when said valve is in an open condition.

6. The valve of claim 2 in which said sleeve has limited sliding movement along said spindle whereby said sleeve is axially limited to stop against the spindle while the valve is in the fully closed position thereby providing a metal-to-metal valve seal.

7. A high flow capacity control valve comprising a body having an axial passage therethrough, means in said body providing a pair of coaxial passages having an axis at an acute angle to the axis of said axial passage, a spindle mounted for axial movement within said axial passage, said spindle having a flow passage therethrough movable into flow establishing full diameter communication with said pair of coaxial passages when said valve is open, said spindle having an annular groove adjacent said flow passage, a compressible sealing element received in said groove, a ring carried by and rigidly affixed to said body and having an inner peripheral surface positioned to engage said sealing element and a tapered side face diverging from said inner peripheral surface, and a slidable sleeve mounted on said spindle, said sleeve having a tapered leading outer face engageable with said tapered side face of said ring in sealing relation and a tapered inner face arranged to engage said sealing element when said valve is closed thereby providing a bubble-tight seal.

8. A high flow capacity control valve comprising a body having an axially extending cavity therein and a pair of coaxial fluid flow passages intercepting said axially extending cavity at an acute angle to the axis thereof, a spindle movable longitudinally along said axial cavity and having a flow passage therethrough at the same acute angle as the flow passages in the body adapted to be moved into and out of alignment with said flow passages to provide a straight line flow passage through the valve, said spindle and valve body coacting to provide annular relief cavities around the spindle extending axially on both sides of the flow passage of the body, means rigid with the walls of said axial cavity providing a barrier between said body and said spindle separating said cavities and preventing flow other than leakage between said cavities, and each separated cavity communicating with a separate flow passage of the body to vent said flow passages completely around the spindle to relieve sideloads on the spindle.

9. The valve of claim 8 wherein the barrier between the spindle and body is through a ring carried by the body around the spindle.

10. The valve of claim 9 wherein the spindle carries a compressible seal engaging the ring.

11. The valve of claim 1 wherein the cavities are separated by said barrier and each separated cavity communicates with a separate coaxial fluid flow passage in the valve body.

References Cited

UNITED STATES PATENTS

| 1,111,244 | 9/1914 | Wilson | 251—282 |
| 2,845,948 | 8/1958 | Parker | 251—281 X |
| 3,240,466 | 3/1966 | Meyer | 251—333 X |
| 3,241,812 | 3/1966 | Worden et al. | 251—282 X |
| 3,290,002 | 12/1966 | Self | 251—332 |
| 3,330,527 | 7/1967 | Nurkiewicz | 251—332 |

FOREIGN PATENTS

| 1,038,854 | 9/1958 | Germany. |
| 299,608 | 8/1932 | Italy. |

WALTER A. SCHEEL, Primary Examiner

L. G. MACHLIN, Assistant Examiner

U.S. Cl. X.R.

251—325, 333